US006414438B1

(12) United States Patent
Borisov et al.

(10) Patent No.: US 6,414,438 B1
(45) Date of Patent: Jul. 2, 2002

(54) METHOD OF PRODUCING SHORT-WAVE RADIATION FROM A GAS-DISCHARGE PLASMA AND DEVICE FOR IMPLEMENTING IT

(75) Inventors: Vladimir Mikhailovich Borisov, Troitsk; Oleg Borisovich Khristoforov, Moscow, both of (RU)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 09/693,490

(22) Filed: Oct. 20, 2000

(30) Foreign Application Priority Data

Jul. 4, 2000 (RU) ........................................ 200117336

(51) Int. Cl.[7] ................................................ B23K 10/00
(52) U.S. Cl. ............................ 315/111.31; 315/111.41; 219/121.48; 219/121.54
(58) Field of Search ....................... 315/111.21, 111.31, 315/111.41, 111.81, 111.91; 219/121.31, 121.41, 121.48, 121.54, 121.57; 313/231.31, 231.41

(56) References Cited

U.S. PATENT DOCUMENTS 3,150,483 A 9/1964 Mayfield et al. ............. 60/35.5
3,232,046 A 2/1966 Meyer ........................ 60/35.5

(List continued on next page.)

FOREIGN PATENT DOCUMENTS

DE 295 21 572 U1 12/1997 ........... H01S/3/038
DE 197 53 696 A1 6/1999 ............ H05G/2/00

OTHER PUBLICATIONS

Patent Abstracts of Japan, application No. 63–125720, 1 page.

(List continued on next page.)

*Primary Examiner*—Don Wong
*Assistant Examiner*—Wilson Lee
(74) *Attorney, Agent, or Firm*—Sierra Patent Group, Ltd.; Andrew V. Smith

(57) ABSTRACT

A method and apparatus produce short-wave radiation from a gas-discharge plasma, comprising pre-ionization of the gas in the discharge region between coaxial electrodes achieved through an axial aperture formed in one of the electrodes and initiation of a pinch-type discharge. In order to increase the efficiency, energy, average power and stability of the radiation of the gas-discharge plasma, pre-ionization is achieved by a flux of radiation having wavelengths from the UV to X-ray range and by a flux of accelerated electrons from the plasma of a pulsed sliding discharge initiated in a region not optically communicating with the axis of the pinch-type discharge, with a rate of growth of the discharge voltage across the region of more than $10^{11}$ V/s, the fluxes of radiation and electrons being formed axially symmetrically and directed into the part of the discharge region outside the axis. In a device for implementing the method, the source of pre-ionization is disposed outside the discharge chamber and is designed in the form of an axially symmetrical system for forming a sliding discharge, said system comprising an elongated initiating electrode coated with a dielectric layer on the surface of which electrode a trigger electrode is disposed, the initiating electrode being arranged coaxially with the electrodes of the discharge chamber and formed in such a way that the dielectric layer is disposed in a region not optically communicating with the axis of the discharge chamber and one of the electrodes of the system for forming a sliding discharge being combined with one of the electrodes of the discharge chamber, a pulse generator being introduced into the device that has a rate of growth of output voltage of more than $10^{11}$ V/s, the output of positive polarity of which is connected to the initiating electrode for forming the sliding discharge. A dielectric insert with an axial aperture can be introduced into the discharge chamber, on the surface of said insert there are disposed electrodes of the discharge chamber.

17 Claims, 2 Drawing Sheets

U.S. PATENT DOCUMENTS

| | | | | | |
|---|---|---|---|---|---|
| 3,279,176 | A | | 10/1966 | Boden | 60/202 |
| 3,961,197 | A | | 6/1976 | Dawson | 250/493 |
| 3,969,628 | A | | 7/1976 | Roberts et al. | 250/402 |
| 4,143,275 | A | | 3/1979 | Mallozzi et al. | 250/503 |
| 4,203,393 | A | | 5/1980 | Giardini | 123/30 D |
| 4,229,708 | A | | 10/1980 | Mani et al. | 331/94.5 G |
| 4,364,342 | A | | 12/1982 | Asik | 123/143 B |
| 4,369,758 | A | | 1/1983 | Endo | 123/620 |
| 4,494,043 | A | * | 1/1985 | Stallings et al. | 315/111.41 |
| 4,504,964 | A | | 3/1985 | Cartz et al. | 378/119 |
| 4,507,588 | A | | 3/1985 | Asmussen et al. | 315/39 |
| 4,534,034 | A | | 8/1985 | Hohla et al. | 372/59 |
| 4,536,884 | A | | 8/1985 | Weiss et al. | 378/119 |
| 4,538,291 | A | | 8/1985 | Iwamatsu | 378/119 |
| 4,561,406 | A | | 12/1985 | Ward | 123/536 |
| 4,592,056 | A | | 5/1986 | Elton | 372/5 |
| 4,618,971 | A | | 10/1986 | Weiss et al. | 378/34 |
| 4,633,492 | A | | 12/1986 | Weiss et al. | 378/119 |
| 4,635,282 | A | | 1/1987 | Okada et al. | 378/34 |
| 4,718,072 | A | | 1/1988 | Marchetti et al. | 372/36 |
| 4,752,946 | A | | 6/1988 | Gupta et al. | 378/119 |
| 4,774,914 | A | | 10/1988 | Ward | 123/162 |
| 4,797,888 | A | | 1/1989 | Klopotek | 372/38 |
| 4,837,794 | A | | 6/1989 | Riordan et al. | 378/119 |
| 4,977,573 | A | | 12/1990 | Bittenson et al. | 372/81 |
| 5,023,897 | A | | 6/1991 | Neff et al. | 378/122 |
| 5,027,366 | A | | 6/1991 | Akins et al. | 372/57 |
| 5,081,638 | A | | 1/1992 | Gallant et al. | 372/86 |
| 5,136,605 | A | | 8/1992 | Basting et al. | 372/59 |
| 5,142,166 | A | | 8/1992 | Birx | 307/419 |
| 5,161,238 | A | | 11/1992 | Mehmke | 359/738 |
| 5,175,755 | A | | 12/1992 | Kumakhov | 378/34 |
| 5,241,244 | A | | 8/1993 | Cirri | 315/111.41 |
| 5,247,535 | A | | 9/1993 | Müller-Horsche et al. | 372/86 |
| 5,327,475 | A | | 7/1994 | Golovanisky et al. | 378/34 |
| 5,337,330 | A | | 8/1994 | Larson | 372/86 |
| 5,347,532 | A | | 9/1994 | Rebhan et al. | 372/87 |
| 5,377,215 | A | | 12/1994 | Das et al. | 372/57 |
| 5,430,752 | A | | 7/1995 | Basting et al. | 372/59 |
| 5,442,910 | A | | 8/1995 | Anderson | 60/266 |
| 5,499,282 | A | | 3/1996 | Silfvast | 372/119 |
| 5,502,356 | A | | 3/1996 | McGeoch | 315/111.91 |
| 5,504,795 | A | | 4/1996 | McGeoch | 378/119 |
| 5,577,092 | A | | 11/1996 | Kublak et al. | 378/119 |
| 5,637,962 | A | | 6/1997 | Prono et al. | 315/111.21 |
| 5,719,896 | A | | 2/1998 | Watson | 372/86 |
| 5,763,930 | A | | 6/1998 | Partlo | 250/504 R |
| 5,875,207 | A | | 2/1999 | Osmanow | 372/86 |
| 5,963,616 | A | | 10/1999 | Silfvast et al. | 372/122 |
| 5,978,406 | A | | 11/1999 | Rokni et al. | 372/58 |
| 6,031,241 | A | | 2/2000 | Silfvast et al. | 250/504 R |
| 6,051,841 | A | | 4/2000 | Partlo | 250/504 R |
| 6,075,838 | A | | 6/2000 | McGeoch | 378/119 |
| 6,084,198 | A | * | 7/2000 | Birx | 315/111.31 |
| 6,172,324 | B1 | * | 1/2001 | Birx | 315/111.31 |

OTHER PUBLICATIONS

B. Moosman, et al., "Measurements of Gas Preionization for Plasma Radiation Sources," *Review of Scientific Instruments*, vol. 70, No. 1, Jan. 1999, pp. 672–676.

Akira Ohzu, "Enhancement of Soft X–ray Emission from a Pinch Plasma Using a Rotating Plasma for Preionization," *Optics & Laser Technology*, 32 (2000), pp. 379–383.

D. Hong, et al., "Study of a Fast Ablative Capillary Discharge Dedicated to Soft X–ray Production," *Review of Scientific Instruments*, vol. 71, No. 1, Jan. 2000, pp. 15–19.

Mather, "Formation of a High Density Deuterium Plasma Focus," *Physics of Fluids*, 8 (3), Feb. 1965, pp. 366–377.

H. Mahr, et al., "Use of Metastable Ions for a Soft X–ray Laser," *Optics Communications*, vol. 10, No. 3, Mar. 1974, pp. 227228.

S. A. Mani, et al., "Lithium–ion Soft X–ray Laser," *Journal of Applied Physics*, vol. 47, No. 7, Jul. 1976, pp. 3099–3106.

Shiloh, et al., "Z Pinch of a Gas Jet," *Phys. Rev. Lett.*, 40 (8) Feb. 20, 1978, pp. 515–518.

C. Stallings, et al., "Imploding Argon Plasma Experiments," *Appl. Phys. Lett.*, vol. 35, No. 7, Oct. 1, 1979, pp. 524–527.

J. R. Williamson, et al., "Emission Spectra of Core Excited Even–Parity 2*P* States of Neutral Lithium," *Physical Review Letters* , Apr. 28, 1980, vol. 44, No. 17, pp. 1125–1128.

Pearlman, et al., "X–ray Lithography Using a Pulsed Plasma Source," *1190 J. Vac Sci. Technol.* 19 (4) Nov./Dec. 1981, pp. 1190–1193.

Matthews, et al., "Plasma Sources for X–ray Lithography," *136 SPIE*, vol. 333, Submicron Lithography (1982), pp. 136–139.

Choi, et al., "Temporal Development of Hard and Soft X–ray Emission from Gas–Puff Z Pinch," *2162 Rev. Sci. Instrum.* 57 (8), Aug. 1986.

Weinberg, et al., "A Small Scale Z–Pinch Device as an Intense Soft X–ray Source," *Nuclear Instruments and Methods in Physics Research*, A242, (1986) 535–538.

Hartman, et al., "Homogeneous Cylindrical Plasma Source for Short–Wavelength Laser," *Appl. Phys. Lett.*, 58 (23), Jun. 10, 1991, pp. 2619–2621.

Giordano, et al., "Magnetic Pulse Compressor for Prepulse Discharge in Spiker Sustainer Technique for XeCl Lasers," *Rev. Sci. Instrum.*, 65 (8), Aug. 1994, pp. 2475–2481.

M. McGeoch, "Radio Frequency Preionized Z–Pinch Source for Extreme Ultraviolet Lithography, " *Applied Optics*, vol. 37, No. 9, Mar. 20, 1998, pp. 1651–1658.

2nd International EUVL Workshop, Proceedings SEMATECH–Oct. 20, 2000, San Francisco, Presentation entitled: Applicability of ULE for EUV Lithography, S. Roux, et al., 9 pages.

2nd International EUVL Workshop, Proceedings SEMATECH–Oct. 20, 2000, San Francisco, Presentation entitled: Laser Plasma EUV Source Development, Richard H. Moyer, 9 pages.

2nd International EUVL Workshop, Proceedings SEMATECH–Oct. 20, 2000, San Francisco, Presentation entitled: Development of a High Average Power Extreme–ultraviolet Electric Capillary Discharge Source, Howard Bender, et al., 7 pages.

2nd International EUVL Workshop, Proceedings SEMATECH–Oct. 20, 2000, San Francisco, Presentation entitled: Description of the French PREUVE R & D Program on EUV Sources, Reflective Optics, Masks, and Relevant Metrologies for EUV Lithography, P. Boher, et al., 22 pages.

2nd International EUVL Workshop, Proceedings SEMATECH–Oct. 20, 2000, San Francisco, Presentation entitled: Studies on Extreme Ultraviolet Sources, R. Lebert, et al., 18 pages.

2nd International EUVL Workshop, Proceedings SEMATECH–Oct. 20, 2000, San Francisco, Presentation entitled: A High–Power Laser–produced Plasma EUVL Source for ETS, Paul D. Rockett, et al., 6 pages.

2nd International EUVL Workshop, Proceedings SEMATECH–Oct. 20, 2000, San Francisco, Presentation entitled: EUVL Capillary Discharge Source, Glenn D. Kubiak, 19 pages.

2nd International EUVL Workshop, Proceedings SEMATECH–Oct. 20, 2000, San Francisco, Presentation entitled: EUV Lithography Source System, A. M. M. Todd, 10 pages.

2nd International EUVL Workshop, Proceedings SEMATECH–Oct. 20, 2000, San Francisco, Presentation entitled: Development of the Large Field EUVL Camera, H. Kinoshita, et al., 10 pages.

2nd International EUVL Workshop, Proceedings SEMATECH–Oct. 20, 2000, San Francisco, Presentation entitled: Progress on Fabrication of EUVL Mask Substrates, Ken Blaedel, et al., 18 pages.

2nd International EUVL Workshop, Proceedings SEMATECH–Oct. 20, 2000, San Francisco, Presentation entitled: Inspection of EUVL Mask Blanks Using Commercial Wafer Inspection Tools, Chris Walton, et al., 10 pages.

2nd International EUVL Workshop, Proceedings SEMATECH–Oct. 20, 2000, San Francisco, Presentation entitled: A Recent Look into Finishing Results of NZTE Mask Blank Substrates, Fredi Schubert, et al., 15 pages.

2nd International EUVL Workshop, Proceedings SEMATECH–Oct. 20, 2000, San Francisco, Presentation entitled: Interaction of EUVL Mask Standards, Todd J. Bednarek, et al., 22 pages.

2nd International EUVL Workshop, Proceedings SEMATECH–Oct. 20, 2000, San Francisco, Presentation entitled: Characterization of Ru Buffer Layer for EUV Mask Patterning, B. T. Lee, et al., 17 pages.

2nd International EUVL Workshop, Proceedings SEMATECH–Oct. 20, 2000, San Francisco, Presentation entitled: Characterization of EUVL Mask Defects by EUV Far–Field Scattering Patterns, Moonsuk Yi, et al., 12 pages.

2nd International EUVL Workshop, Proceedings SEMATECH–Oct. 20, 2000, San Francisco, Presentation entitled: CTE in ULE Glass, Charles T. Hamilton, et al., 14 pages.

2nd International EUVL Workshop, Proceedings SEMATECH–Oct. 20, 2000, San Francisco, Presentation entitled: Evaluation of Resist Performance Utilizing EUV Microfield Exposure Tool, Hiroaki Oizumi, et al., 18 pages.

2nd International EUVL Workshop, Proceedings SEMATECH–Oct. 20, 2000, San Francisco, Presentation entitled: The Resist Outgassing in the EUV Exposure, Takeo Watanabe, et al., 22 pages.

2nd International EUVL Workshop, Proceedings SEMATECH–Oct. 20, 2000, San Francisco, Presentation entitled: Adding Static Printing Capabilities to the EUV PS/PDI, Patrick Naulleau, et al., 18 pages.

2nd International EUVL Workshop, Proceedings SEMATECH–Oct. 20, 2000, San Francisco, Presentation entitled: EUV Alignment and Testing of a 4–Mirror Ring–Field EUV Optical System, Kenneth Goldberg, 18 pages.

2nd International EUVL Workshop, Proceedings SEMATECH–Oct. 20, 2000, San Francisco, Presentation entitled: The Extreme Ultraviolet Source Developed at CEA Saclay in the Frame of the French National Project Preuve, O. Sublemontier, et al., 15 pages.

2nd International EUVL Workshop, Proceedings SEMATECH–Oct. 20, 2000, San Francisco, Presentation entitled: Construction of the Projection Optics Box for the Engineering Test Stand, John S. Taylor, 23 pages.

2nd International EUVL Workshop, Proceedings SEMATECH–Oct. 20, 2000, San Francisco, Presentation entitled: Optics for EUV Lithography, Peter Kürz, 14 pages.

2nd International EUVL Workshop, Proceedings SEMATECH–Oct. 20, 2000, San Francisco, Presentation entitled: Laser Plasma EUV Source Based on a Supertonic Double Jet, Rene de Bruijin, et al., 1 page.

2nd International EUVL Workshop, Proceedings SEMATECH–Oct. 20, 2000, San Francisco, Presentation entitled: Fabrication of ETS Set II Optics: Results and Future Development, Lou Marchetti, et al., 20 pages.

2nd International EUVL Workshop, Proceedings SEMATECH–Oct. 20, 2000, San Francisco, Presentation entitled: Interaction of Dual Laser Pulses with Krypton Droplets, S. J. McNaught, et al., 13 pages.

2nd International EUVL Workshop, Proceedings SEMATECH–Oct. 20, 2000, San Francisco, Presentation entitled: Deposition Modeling of 2D–Graded Coatings on Curved Substrates, M. D. Kriese, et al., 25 pages.

2nd International EUVL Workshop, Proceedings SEMATECH–Oct. 20, 2000, San Francisco, Presentation entitled: The Progress in Mirror Fabrication Technology in Japan, Kazuya Ota, et al., 13 pages.

2nd International EUVL Workshop, Proceedings SEMATECH–Oct. 20, 2000, San Francisco, Presentation entitled: Multilayer Mirror Coating for High Numerical Aperture Extreme–ultraviolet Lithography Systems, J. A. Folta, et al., 21 pages.

2nd International EUVL Workshop, Proceedings SEMATECH–Oct. 20, 2000, San Francisco, Presentation entitled: X–ray and EUV Emission Induced by Variable Pulsewidth Irradiation of Ar and Kr Clusters and Droplets, E. Parra, et al., 23 pages.

2nd International EUVL Workshop, Proceedings SEMATECH–Oct. 20, 2000, San Francisco, Presentation entitled: E–Beam Coatong Technology for EUVL Optics, Eric Louis, et al., 16 pages.

2nd International EUVL Workshop, Proceedings SEMATECH–Oct. 20, 2000, San Francisco, Presentation entitled: Evaluation of Mo/Si Multilayer for EUVL Mask Blank, H. Yamanashi, et al., 14 pages.

2nd International EUVL Workshop, Proceedings SEMATECH–Oct. 20, 2000, San Francisco, Presentation entitled: Stress Control of Mo/Si Multilayers, K. Murakami, et al., 11 pages.

2nd International EUVL Workshop, Proceedings SEMATECH–Oct. 20, 2000, San Francisco, Presentation entitled: Z–Pinch and Astron: Inertial Plasma EUV Sources, Malcolm McGeoch, et al., 10 pages.

2nd International EUVL Workshop, Proceedings SEMATECH–Oct. 20, 2000, San Francisco, Presentation entitled: A Buffer–Layer Smoothing Strategy for the Mitigation of Mo/Si Reticle Defects Nucleated by Small Substrate Particles, P. B. Mirkarimi, et al., 22 pages.

2nd International EUVL Workshop, Proceedings SEMATECH–Oct. 20, 2000, San Francisco, Presentation entitled: EUV Stepper Characterization Using Lithography Modeling, Kenny Toh, et al., 16 pages.

2nd International EUVL Workshop, Proceedings SEMATECH–Oct. 20, 2000, San Francisco, Presentation entitled: Integration of EUV–Thickness Resist Processes into MPU Manufacturing Flows, Jonathan Cobb, et al., 13 pages.

2nd International EUVL Workshop, Proceedings SEMATECH–Oct. 20, 2000, San Francisco, Presentation entitled: Development Program of EUV Mask in Preuve, JY. Robic, et al., 18 pages.

$2^{nd}$ International EUVL Workshop, Proceedings SEMATECH–Oct. 20, 2000, San Francisco, Presentation entitled: High–NA Camera for an EUVL Microstepper, Laytron Hale, et al., 13 pages.

$2^{nd}$ International EUVL Workshop, Proceedings SEMATECH–Oct. 20, 2000, San Francisco, Presentation entitled: Deformation of EUVL Mask Due to Multilayer and Absorber–Pattern Stress, A. China, et al., 16 pages.

$2^{nd}$ International EUVL Workshop, Proceedings SEMATECH–Oct. 20, 2000, San Francisco, Presentation entitled: Progress and Challenges in EUVL Mask Repairs, T. Liang, et al., 16 pages.

$2^{nd}$ International EUVL Workshop, Proceedings SEMATECH–Oct. 20, 2000, San Francisco, Presentation entitled: Electromagnetic Simulation of EUV Masks, Patrick Schiavone, et al., 2 pages.

$2^{nd}$ International EUVL Workshop, Proceedings SEMATECH–Oct. 20, 2000, San Francisco, Presentation entitled: A Practical Approach for Modeling EUVL Mask Defects, Eric Gullikson, et al., 14 pages.

$2^{nd}$ International EUVL Workshop, Proceedings SEMATECH–Oct. 20, 2000, San Francisco, Presentation entitled: Exploring the Origin and Impact of Pattern Dependent Focus Shifts and Asymmetry on Bossung Curves Through Rigorous EUV Mask Simulations, Christof Krauschik, et al., 17 pages.

$2^{nd}$ International EUVL Workshop, Proceedings SEMATECH–Oct. 20, 2000, San Francisco, Presentation entitled: Optical Inspection of EUV reticles, Donald W. Pettibone, et al., 20 pages.

$2^{nd}$ International EUVL Workshop, Proceedings SEMATECH–Oct. 20, 2000, San Francisco, Presentation entitled: Reticle Flatness for Production EUV Luthography, Santiago del Puerto, et al., 12 pages.

$2^{nd}$ International EUVL Workshop, Proceedings SEMATECH–Oct. 20, 2000, San Francisco, Presentation entitled: Predictive Model of the Cost of EUVL Masks, Scott D. Hector, et al., 16 pages.

$2^{nd}$ International EUVL Workshop, Proceedings SEMATECH–Oct. 20, 2000, San Francisco, Presentation entitled: TaN and Cr EUV Mask Fabrication and Characterization, Pei–yang Yan, et al., 15 pages.

$2^{nd}$ International EUVL Workshop, Proceedings SEMATECH–Oct. 20, 2000, San Francisco, Presentation entitled: Simulation of Multilayer Defects in EUV Masks, Masaaki Ito, et al., 15 pages.

$2^{nd}$ International EUVL Workshop, Proceedings SEMATECH–Oct. 20, 2000, San Francisco, Presentation entitled: Low–defect Multilayers for EUVL Mask Blanks, C. Montcalm, et al., 10 pages.

$2^{nd}$ International EUVL Workshop, Proceedings SEMATECH–Oct. 20, 2000, San Francisco, Presentation entitled: Inclusions Within ULE Glass, Dondi Brewer, et al., 13 pages.

$2^{nd}$ International EUVL Workshop, Proceedings SEMATECH–Oct. 20, 2000, San Francisco, Presentation entitled: First Environment Data from the Engineering Test Stand (ETS), Mike Malinowaki, et al., 5 pages.

$2^{nd}$ International EUVL Workshop, Proceedings SEMATECH–Oct. 20, 2000, San Francisco, Presentation entitled: EUVL Thermophoretic Mask Protection, Daniel E. Derick, et al., 6 pages.

$2^{nd}$ International EUVL Workshop, Proceedings SEMATECH–Oct. 20, 2000, San Francisco, Presentation entitled: An Infinitely Selective Repair Buffer, James R. Wasson, et al., 17 pages.

$2^{nd}$ International EUVL Workshop, Proceedings SEMATECH–Oct. 20, 2000, San Francisco, Presentation entitled: Use of Molecular Oxygen to Reduce EUV–induced Carbon Contamination of Optics, M. Malinowski, et al., 7 pages.

$2^{nd}$ International EUVL Workshop, Proceedings SEMATECH–Oct. 20, 2000, San Francisco, Presentation entitled: Contamination Research for the a–RT, Hans Meiling, et al., 24 pages.

$2^{nd}$ International EUVL Workshop, Proceedings SEMATECH–Oct. 20, 2000, San Francisco, Presentation entitled: RF Oxygen Discharge Cleaning of Carbon from EUV Optics, Samuel Graham, et al., 6 pages.

$2^{nd}$ International EUVL Workshop, Proceedings SEMATECH–Oct. 20, 2000, San Francisco, Presentation entitled: E–D Characteristics and Aberration Sensitivity of the Micro–Exposure Tool (MET), Russell Hudyma, et al., 16 pages.

$2^{nd}$ International EUVL Workshop, Proceedings SEMATECH–Oct. 20, 2000, San Francisco, Presentation entitled: A Vacuum Spark Point Source for EUV Lithography, Emilio Panarella, 19 pages.

$2^{nd}$ International EUVL Workshop, Proceedings SEMATECH–Oct. 20, 2000, San Francisco, Presentation entitled: Study of a Cavity–Confined Plasma as A Debris–Less and High Conversation Efficiency Source for EUV Lithography, T. Tomie, et al., 15 pages.

$2^{nd}$ International EUVL Workshop, Proceedings SEMATECH–Oct. 20, 2000, San Francisco, Presentation entitled: Xenon Liquid–Jet Laser–Plasma Source for EUV Lithography, Bjorn A. M. Hannson, et al., 19 pages.

$2^{nd}$ International EUVL Workshop, Proceedings SEMATECH–Oct. 20, 2000, San Francisco, Presentation entitled: EUV Micro–Exposure Tool (MET) for Near–Term Development Using a High NA Projection System, 18 pages.

$2^{nd}$ International EUVL Workshop, Proceedings SEMATECH–Oct. 20, 2000, San Francisco, Presentation entitled: Kilohertz Pinch Plasma Radiation Source for EUV–Lithography, Klaus Bermann, et al., 12 pages.

$2^{nd}$ International EUVL Workshop, Proceedings SEMATECH–Oct. 20, 2000, San Francisco, Presentation entitled: Alignment of a Ring–field EUV Projection Optics System by Visible–light Interferometry, Henry N. Chapman, et al., 13 pages.

$2^{nd}$ International EUVL Workshop, Proceedings SEMATECH–Oct. 20, 2000, San Francisco, Presentation entitled: Report on the International EUVL Source Workshop, Vadim Banine, et al., 9 pages.

$2^{nd}$ International EUVL Workshop, Proceedings SEMATECH–Oct. 20, 2000, San Francisco, Presentation entitled: Flying Circus EUV Source Comparison, Remko Stuik, et al., 21 pages.

$2^{nd}$ International EUVL Workshop, Proceedings SEMATECH–Oct. 20, 2000, San Francisco, Presentation entitled: Recent Development Activities on EUVL at ASET, Shinji Okazaki, et al., 28 pages.

$2^{nd}$ International EUVL Workshop, Proceedings SEMATECH–Oct. 20, 2000, San Francisco, Presentation entitled: ASML Program on Extreme UV Lithography, Hans Meiling, et al., 22 pages.

2nd International EUVL Workshop, Proceedings SEMATECH–Oct. 20, 2000, San Francisco, Presentation entitled: Rigorous EUV Imaging Simulations and their Assessment on Overall System Performance, Christof Krautschik, et al., 22 pages.

2nd International EUVL Workshop, Proceedings SEMATECH–Oct. 20, 2000, San Francisco, Presentation entitled: SAGEM Contribution to PREUVE & Trends in EUVL Optics, 21 pages.

2nd International EUVL Workshop, Proceedings SEMATECH–Oct. 20, 2000, San Francisco, Presentation entitled: SVGL EUVL Program Update, Noreen Harned, 12 pages.

2nd International EUVL Workshop, Proceedings SEMATECH–Oct. 20, 2000, San Francisco, Presentation entitled: manufacturing with EUV?, Peter Silverman, 15 pages.

2nd International EUVL Workshop, Proceedings SEMATECH–Oct. 20, 2000, San Francisco, Presentation entitled: Source for EUV Lithography Based on a Dense Plasma Focus, Igor Fomenkov, et al., 30 pages.

2nd International EUVL Workshop, Proceedings SEMATECH–Oct. 20, 2000, San Francisco, Presentation entitled: Recent Activities Using EUV Laboratory Tool at Hit, H. Kinoshita, et al., 20 pages.

2nd International EUVL Workshop, Proceedings SEMATECH–Oct. 20, 2000, San Francisco, Presentation entitled: Commercial Compact, Low Cost EUV–Source for Laboratory Use, R. Lebert, et al., 10 pages.

2nd International EUVL Workshop, Proceedings SEMATECH–Oct. 20, 2000, San Francisco, Presentation entitled: Low–defect Multilayers for EUVL Mask Blanks, C. Montcalm, et al., 10 pages.

2nd International EUVL Workshop, Proceedings SEMATECH–Oct. 20, 2000, San Francisco, Presentation entitled: System Integration and Performance of the EUV Engineering Test Stand, D. A. Tichenor, et al., 11 pages.

Bailey, et al., "Evaluation of the Gas Puff Z Pinch as an X–ray Lithography and Microscopy Source," *Appl. Phys. Lett.*, vol. 40, No. 1, Jan. 1, 1982, pp. 33–34.

Guido Schriever, et al., "Extreme Ultrviolet light Generation Based on Laser Produced Plasmas (LPP) and Gas Discharge Based Pinch Plasmas: A Comparison of Different Concepts," *Proceedings of SPIE*, vol. 3997, 2000, pp. 162–168.

* cited by examiner

METHOD OF PRODUCING SHORT-WAVE RADIATION FROM A GAS-DISCHARGE PLASMA AND DEVICE FOR IMPLEMENTING IT

PRIORITY

This application claims the benefit of priority under 35 U.S.C. 119 to Russian patent application no. 2000117336, filed Jul. 4, 2000, which is hereby incorporatd by reference.

BACKGROUND OF THE INVENTION

1. Field of the Invention

The invention relates to a method and device for producing extremely short-wave UV and soft X-ray radiation from a dense hot plasma discharge of pinch type. The field of application includes lithography, particularly in the spectral range around 13.5 nm, lasers in the short-wave UV and X-ray ranges, and X-ray microscopy.

2. Discussion of the Related Art

A method is known for producing short-wave radiation at $\lambda$=13.5 nm using a plasma focus (see U.S. Pat. No. 5,763,930, hereby incorporated by reference). However, a condition of effective operation is the addition of lithium vapor to the inert gas contained in the discharge chamber, and this substantially complicates the design of the source of radiation and contaminates the space outside the discharge.

A method of producing short-wave radiation with the aid of a z-pinch involving RF pre-ionization is devoid of this disadvantage, but the dielectric wall of the discharge chamber at which the pinch-type discharge is initiated is subject both to exposure to powerful radiation flux and the substance that forms as a result of electrode erosion (see U.S. Pat. No. 5,504,795, hereby incorporated by reference). This limits the possibilities of achieving a long service life when this approach is implemented.

A close technical achievement is a method of producing short-wave radiation from a gas-discharge plasma that consists in the pre-ionization of gas in the discharge region between coaxial electrodes achieved through an axial aperture in one of the electrodes, and in initiating a pinch-type discharge (see German patent DE 197 53 696 A1, hereby incorporated by reference).

The device for implementing this method contains a discharge chamber having two axially symmetrical electrodes optically communicating through an aperture formed in one of the electrodes, with a source of pre-ionization disposed outside the discharge chamber (see the '696 published application).

In this method and device, pre-ionization is achieved by a low-current discharge that is automatically formed in a cavity of the cathode when discharge voltage is applied and that then propagates into the discharge gap through the aperture in the hollow cathode. The internal dielectric wall of the discharge chamber may be disposed outside the zone irradiated by the discharge, and this enables a long service life to be achieved in a periodically pulsed operating mode.

Disadvantages of this method and the device for implementing it are a low efficiency of conversion of the energy input into radiation in the short-wave range due to the low level of pre-ionization and its non-ideal spatial distribution in the gap between the electrodes of the discharge chamber. Since the pre-ionization is carried out substantially in the paraxial region of the discharge gap, increasing the cross-sectional area of a pinch-type discharge is made difficult at its initial stage, and this limits the possibility of increasing the energy and the average power of the short-wave radiation. In addition, the long time of formation (approximately 1 ms) of the automatic pre-ionization and of the initiation of a pinch-type discharge compared with the time interval between individual pulses and the low rate of growth (approximately $10^7$ V/s) of the discharge voltage limit the possibility of achieving a high radiation energy stability from pulse to pulse.

It is desired to provide an increase in the efficiency, average power and stability of short-wave radiation of a gas-discharge plasma.

SUMMARY OF THE INVENTION

In accordance with this object, a method is provided for producing short-wave radiation from a gas-discharge plasma, including pre-ionization of the gas in the discharge region between coaxial electrodes achieved through an axial aperture formed in one of the electrodes and initiation of a pinch-type discharge. Pre-ionization is achieved simultaneously by a flux of radiation having wavelengths from the UV to X-ray range and by the flux of accelerated electrons from the plasma of the pulsed sliding discharge initiated in a region not optically communicating with the axis of the pinch-type discharge. A rate of growth of the discharge voltage across the region preferably and advantageously exceeds $10^{11}$ V/s. Fluxes of radiation and electrons are preferably formed axially symmetrically and are directed into part of the discharge region outside the axis.

The method can be implemented by a device containing a discharge chamber having two axially symmetrical electrodes optically communicating through an aperture formed in one of the electrodes, with a source of pre-ionization disposed outside the discharge chamber. The source of pre-ionization preferably derives from an axially symmetrical system of forming a sliding discharge comprising an elongated initiating electrode coated with a dielectric layer, on the surface of which there is disposed a trigger electrode, the initiating electrode being arranged coaxially with the electrodes of the discharge chamber and formed so that the dielectric layer is disposed in a region not optically communicating with the axis of the discharge chamber and one of the electrodes of the system for forming a sliding discharge being combined with one of the electrodes of the discharge chamber, a generator having a rate of growth of output voltage of more than $10^{11}$ V/s being introduced into the device, the output of positive polarity of which is connected to the initiating electrode, while the output of negative polarity of the pulsed generator is connected to the trigger electrode of the system for forming a sliding discharge.

A dielectric insert in which an axial aperture is formed is preferably introduced into the discharge chamber, and the electrodes of the discharge chamber are disposed on the surface of the dielectric insert.

A cylindrical plasma envelope having high conductivity forms in the discharge region as a result of pre-ionization. This establishes the initiation of a pinch-type discharge under ideal conditions and ensures an increase in the output of short-wave radiation from the hot plasma discharge. In contrast to providing a substantially paraxial pre-ionization, the cross-sectional size of the pinch-type discharge is advantageously increased according to the invention when it is initiated. This makes it possible to increase the kinetic energy of the plasma substantially at the stage when it is compressed by the magnetic field of the discharge, and this ensures a more effective heating of the plasma column and an increase in the energy of the short-wave radiation, and also in its average power in the periodically pulsed mode. The use of a high rate of growth of the discharge voltage (more than $10^{11}$ V/s) establishes a highly stable initiation of a homogeneous sliding discharge that achieves pre-ionization and, in turn, ensures the possibility of achieving a high stability of the energy of the short-wave radiation from the plasma of the pinch-type discharge.

INCORPORATION BY REFERENCE

The above cited references and discussion of the related art, and the invention summary are hereby incorporated by reference into this discussion of the preferred embodiment, as providing alternative elements and features that may be used with elements and features of the preferred embodiment in accord with the present invention. For this purpose, the following additional references are hereby incorporated by reference:

C. Stallings, et al., "Imploding Argon Plasma Experiments", Appl. Phys. Lett. 35(7), Oct. 1, 1979;

U.S. Pat. Nos. 4,635,282, 4,504,964, 6,051,841, 3,961,197, 5,763,930, 5,504,795, 5,081,638, 4,797,888, 5,499,282 and 5,875,207; and German patent publications DE 295 21 572 and DE 197 53 696 A1

M. McGeoch, "Radio Frequency Preionized Z-Pinch Source for Extreme Ultraviolet Lithography, Applied Optics, Vol. 37, No. 9 (Mar. 20, 1998); and U.S. patent application Ser. No. 09/532,276 and 60/162,845, each of which is assigned to the same assignee as the present application.

DETAILED DESCRIPTION OF THE PREFERRED EMBODIMENT

Figure 1:
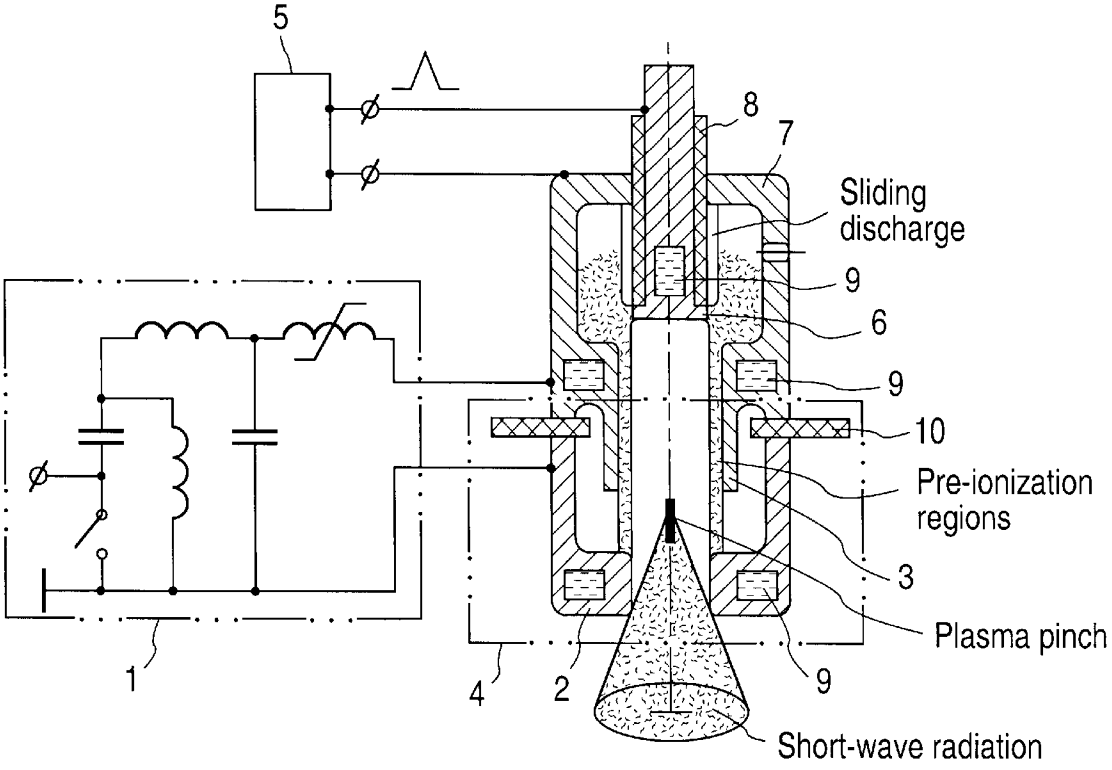
FIG. 1 shows diagrammatically a device for implementing the preferred method.
Figure 2:
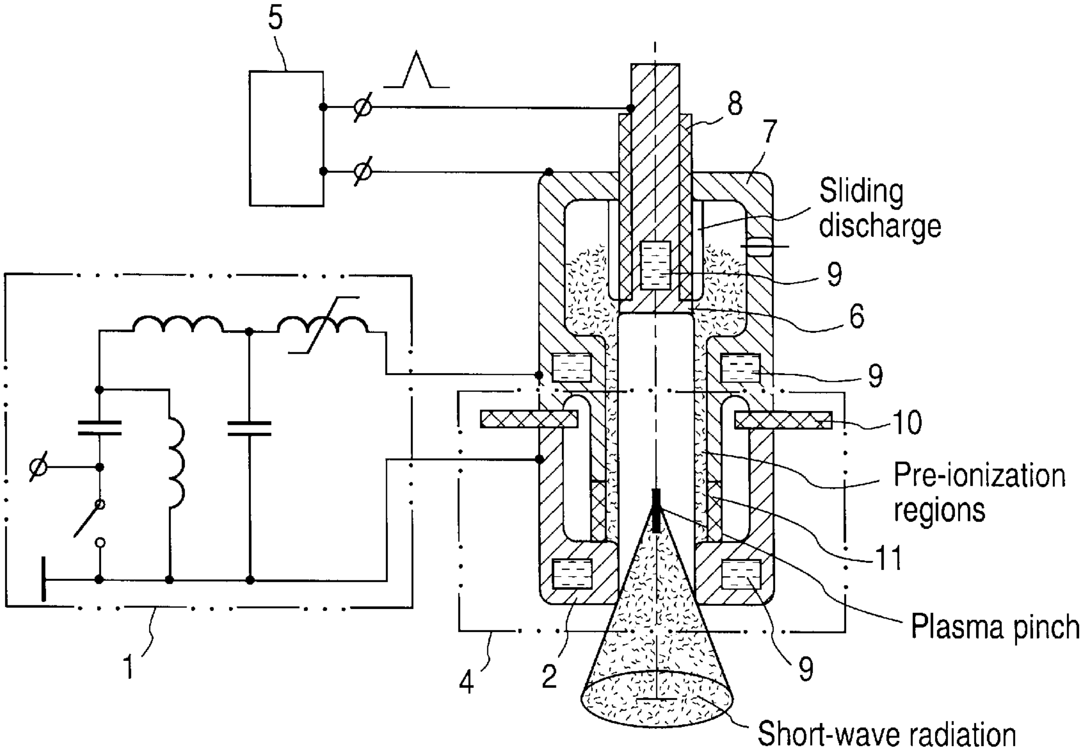
FIG. 2 shows a device into whose discharge chamber a dielectric insert has been introduced.

The device comprises a supply source 1 that, in one case, comprises a storage capacitor with a commutator, charging induction coils, a pulse capacitor and a magnetic switch, and is connected to electrodes 2, 3 of the discharge chamber 4; a pulse generator 5, which is connected to the trigger electrode 6 and the initiating electrode 7 of the axially symmetrical system for forming a sliding discharge on the surface of the dielectric layer 8, and also a liquid coolant 9 and an insulator 10 of the discharge chamber. In FIG. 2 there is disposed in the discharge chamber a dielectric insert 11 in which an axial aperture is formed and on the surface there are disposed electrodes 2, 3.

The method of producing short-wave radiation from the gas-discharge plasma is preferably implemented as follows.

When the supply source 1 is switched on, the voltage starts to increase between the electrodes 2, 3 of the discharge chamber 4.

The pulse generator 5 is switched on and the voltage pulse is applied to the electrodes 6, 7 of the pre-ionizer with a rate of growth greater than $10^{11}$ V/s, between which electrodes a sliding discharge is initiated on the surface of the dielectric layer 8. Alternative approaches to providing electrical pulses to preionization electrodes including wherein the preionization electrodes are coupled to the main electrodes, either directly or through capacitive, inductive and/or resistive elements for controlling the timing and/or magnitude of the preionization pulses with relative to main pulses, are understood to those skilled in the gas discharge arts.

With initiation in a gas of low pressure, preferably $<10^2$ Pa, a beam of accelerated electrons is generated and, in the system for forming a sliding discharge, a homogeneous plasma layer that serves as a source of radiation having wavelengths from the UV to the X-ray range is formed on the surface of the thin dielectric layer. With the rate of growth of voltage, a high stability is achieved in initiating the sliding discharge from pulse to pulse and, in the energy balance of the pulsed sliding discharge at the stage when it is formed, the fraction of energy expended on the formation of the beam of escaping electrons and the generation of X-ray radiation becomes substantial. The negative polarity of the trigger electrode 6 with respect to the initiating electrode 7 decreases the voltage amplitude between the electrodes by a factor of several times compared with the case where the polarity is reversed. Owing to the elongated design of the initiating electrode and, correspondingly, also of the surface discharge gap, that is to say with a length exceeding its cross-sectional size, a further reduction is achieved in the initiating voltage of the sliding discharge in a gas at low pressure. All this reduces the electrical load on the dielectric layer and ensures the achievement of a long operational surface life. The combination of one of the electrodes of the system for forming a sliding discharge with one of the main electrodes of the discharge chamber, for example, electrode 7 with electrode 3, simplifies the design of the device.

In an axially symmetrical system for initiating a sliding discharge with an initiating electrode coaxial with the electrodes of the discharge chamber, generated beams of accelerated electrons and irradiation are formed axially symmetrically. In this process, the beams of accelerated electrons and irradiation are emitted from a region not optically communicating with the discharge chamber and disposed outside it. Owing to the design and disposition of the system for forming the sliding discharge in the form indicated, and also owing to the indicated choice of polarity of the applied voltage, the flux of accelerated electrons and the flux of radiation having wavelengths from the UV to X-ray range is introduced in a controlled manner into the discharge region. The radiation and electron beam propagates through the axial aperture in the electrode 3 into that part of the discharge region outside the axis that is optically communicating with the plasma layer of the sliding discharge and the gas in it is pre-ionized. As a result of the pre-ionization, a cylindrical plasma envelope is created between the electrodes 6, 7 of the discharge region.

Between the electrodes 2, 3, there develops over the cylindrical plasma envelope a low-current discharge, the current of which is limited by the charge leakage current of the pulse capacitor of the supply source 1 through the magnetic switch. During the low-current discharge, the ionization of the plasma envelope increases, the ionization predominantly developing on the outside of the plasma envelope adjacent to the electrodes 2, 3 due to the skin effect.

The magnetic switch opens and the pulse capacitor of the pulse source 1, which is fully charged at this instant discharges through the electrodes 2, 3 onto the plasma envelope created as a result of the pre-ionization and the flow of the low-current discharge. The plasma envelope is compressed by the magnetic field of the current flowing over it and it is confined to the axis of the discharge region for a short time.

The column of the dense hot plasma that forms on the axis of the discharge region emits short-wave radiation. The usable part of the radiation leaves the discharge region through the aperture in one of the electrodes. During this process, the surface of the dielectric layer 8 disposed in the region not optically communicating with the axis of the discharge region is not subjected to exposure to hard UV and X-ray radiation, beams of charged particles and plasma fluxes generated on the axis of the discharge chamber 4. This ensures the achievement of a long operational life of the system for forming the sliding discharge.

The cycle of operation is repeated and, during the time between pulses, the device is cooled by a liquid coolant 9 circulating through the electrodes.

The introduction into the discharge chamber of a dielectric insert 11 (see FIG. 2) in which an axial aperture is formed and on the surface of which there are disposed electrodes of the discharge chamber, simplifies the conditions of efficiently producing short-wave radiation from the gas-discharge plasma. First of all, reliable protection of the insulator 10 of the discharge chamber from the radiation of the pinch-type discharge is ensured, and this increases the reliability of operation of the device within a wide range of operational parameters. Secondly, the inductance of the discharge chamber is reduced, and this makes it possible to reduce the expenditure of energy on producing a dense hot plasma in a pinch-type discharge and to increase the optical output of short-wave radiation. In addition, the plasma envelope created as a result of the pre-ionization is formed on the internal surface of the cylindrical aperture of the dielectric insert, and this stabilizes the pinch-type discharge at stage when it is initiated. This results in an increase in the energy of the short-wave radiation at the final stage of the discharge and in an increase in its stability from pulse to pulse. Since the voltage between the electrodes on the surface of the dielectric insert is minimized as a result of the intense pre-ionization, the probability of its electrical breakdown is sharply reduced. Since the dielectric insert is not an element of the body of the discharge chamber, the mechanical loads in it are minimized. All this makes it possible to ensure a long operational service life of the device if a material is chosen for the dielectric insert that has a high thermal stability, for example silicon nitride $Si_3N_4$.

Thus, the preferred method makes it possible to form a cylindrical plasma envelope that is optimum in shape, dimensions and conductivity stably from pulse to pulse as a result of the pre-ionization, and this results in an increase in the efficiency, average power and energy stability of the short-wave radiation of the gas-discharge plasma.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

In addition, in the method claims that follow, the steps have been ordered in selected typographical sequences. However, the sequences have been selected and so ordered for typographical convenience and are not intended to imply any particular order for performing the steps, except for those claims wherein a particular ordering of steps is expressly set forth or understood by one of ordinary skill in the art as being necessary.

We claim:

1. A method of producing short-wave radiation from a gas-discharge plasma, comprising pre-ionization of the gas in the discharge region between coaxial electrodes achieved through an axial aperture formed in one of the electrodes and initiation of a pinch-type discharge, wherein pre-ionization is achieved simultaneously by the flux of radiation having wavelengths from the UV to the X-ray range and by the flux of accelerated electrons from the plasma of the pulsed sliding discharge initiated in a region not optically communicating with the axis of the pinch-type discharge.

2. The method of claim 1, wherein a rate of growth of the discharge voltage across the region exceeds $10^{11}$ V/s.

3. The method of claim 2, wherein fluxes of radiation and electrons are formed axially symmetrically and are directed into the part of the discharge region outside the axis.

4. A device for producing short-wave radiation from a gas-discharge plasma, comprising a discharge chamber having two axially symmetrical electrodes, which chamber optically communicates through an aperture formed in one of the electrodes, with a source of pre-ionization disposed outside the discharge chamber, wherein the source of pre-ionization is designed in the form of an axially symmetrical system for forming a sliding discharge, which system comprises an elongated electrode coated with a dielectric layer on whose surface is disposed a trigger electrode.

5. The device of claim 4, wherein the elongated electrode is cylindrically formed.

6. The device of claim 5, wherein the elongated electrode is arranged coaxially with main electrodes of the discharge chamber.

7. The device of claim 6, wherein the elongated electrode is configured such that the dielectric layer is disposed in a region not optically linked to the axis of the discharge chamber.

8. The device of claim 7, wherein one of the electrodes of the system for forming the sliding discharge is combined with one of the electrodes of the discharge chamber.

9. The device of claim 8, further comprising a pulse generator connected to the preionization electrodes and having a rate of growth of output voltage of more than $10^{11}$ V/s.

10. The device of claim 9, wherein an output of positive polarity of which generator is connected to the cylindrical electrode, while the output of negative polarity of the pulse generator is connected to the trigger electrode of the system for forming the sliding discharge.

11. The device of claim 10, wherein the discharge chamber includes a dielectric insert in which an axial aperture is formed, and the electrodes of the discharge chamber are disposed on the surface of the dielectric insert.

12. The device of claim 4, wherein the elongated electrode is arranged coaxially with main electrodes of the discharge chamber.

13. The device of claim 4, wherein the elongated electrode is configured such that the dielectric layer is disposed in a region not optically linked to the axis of the discharge chamber.

14. The device of claim 4, wherein one of the electrodes of the system for forming the sliding discharge is combined with one of the electrodes of the discharge chamber.

15. The device of claim 4, further comprising a pulse generator connected to the preionization electrodes and having a rate of growth of output voltage of more than $10^{11}$ V/s.

16. The device of claim 15, wherein an output of positive polarity of which generator is connected to the cylindrical electrode, while the output of negative polarity of the pulse generator is connected to the trigger electrode of the system for forming the sliding discharge.

17. The device of claim 4, wherein the discharge chamber includes a dielectric insert in which an axial aperture is formed, and the electrodes of the discharge chamber are disposed on the surface of the dielectric insert.

* * * * *